(12) United States Patent
Wiley (10) Patent No.: US 11,455,366 B2
(45) Date of Patent: *Sep. 27, 2022

(54) WEBPAGE ACCESSIBILITY COMPLIANCE

(71) Applicant: Capital One Services, LLC, McLean, VA (US)

(72) Inventor: Evan Wiley, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/080,951

(22) Filed: Oct. 27, 2020

(65) Prior Publication Data

US 2021/0182355 A1 Jun. 17, 2021

Related U.S. Application Data (63) Continuation of application No. 16/711,683, filed on Dec. 12, 2019, now Pat. No. 10,839,039.

(51) Int. Cl.
*G06F 16/957* (2019.01)
*G06F 16/958* (2019.01)
*G10L 13/00* (2006.01)

(52) U.S. Cl.
CPC ........ *G06F 16/9577* (2019.01); *G06F 16/958* (2019.01); *G10L 13/00* (2013.01)

(58) Field of Classification Search
CPC ..... G06F 16/9577; G06F 16/958; G10L 13/00
See application file for complete search history.

(56) References Cited

U.S. PATENT DOCUMENTS

| | | | |
|---|---|---|---|
| 7,966,184 B2 * | 6/2011 | O'Conor | G06F 16/957 704/260 |
| 8,103,956 B2 | 1/2012 | Trujillo | |
| 8,504,369 B1 | 8/2013 | Chigier et al. | |
| 10,839,039 B1 * | 11/2020 | Wiley | G10L 13/00 |
| 2002/0065658 A1 | 5/2002 | Kanevsky et al. | |
| 2002/0156799 A1 | 10/2002 | Markel et al. | |
| 2002/0184004 A1 | 12/2002 | Shizuka et al. | |
| 2007/0074167 A1 * | 3/2007 | Cohrs | G06F 11/3672 717/124 |
| 2008/0319973 A1 * | 12/2008 | Thambiratnam | G06F 16/313 707/999.005 |
| 2012/0254723 A1 * | 10/2012 | Kasa | G06F 40/226 715/234 |
| 2014/0088741 A1 | 3/2014 | Molesky | |

(Continued)

*Primary Examiner* — Thu V Huynh
(74) *Attorney, Agent, or Firm* — Banner & Witcoff, Ltd.

(57) ABSTRACT

Aspects described herein may provide determination of compliance with accessibility rules by a webpage. A first version of a webpage may be compliant with the accessibility rules. The first version of the webpage may be modified to create the second version of the webpage. The second version of the webpage may be displayed. A voiceover of the second version of the webpage may be initiated. The voiceover may include starting automatic text-to-speech software that reads aloud the second version of the webpage. The voiceover of the second version of the webpage may be recorded and stored. A textual transcript of the stored recording may be generated. Compliance of the second version of the webpage with the accessibility rules may be determined based on the textual transcript of the stored recording and based on the first version of the webpage.

20 Claims, 5 Drawing Sheets

(56) References Cited

U.S. PATENT DOCUMENTS

| | | | |
|---|---|---|---|
| 2014/0136944 A1* | 5/2014 | Harris | G06F 16/958 |
| | | | 715/234 |
| 2014/0188479 A1 | 7/2014 | Bellamy et al. | |
| 2016/0034433 A1 | 2/2016 | Yamat et al. | |
| 2016/0306784 A1* | 10/2016 | Bradley | G10L 25/48 |
| 2019/0163733 A1 | 5/2019 | Dua et al. | |
| 2019/0268377 A1* | 8/2019 | Parry | H04L 51/046 |
| 2019/0295539 A1* | 9/2019 | Mese | G10L 15/01 |

* cited by examiner

WEBPAGE ACCESSIBILITY COMPLIANCE

CROSS-REFERENCE TO RELATED APPLICATIONS

The present application is a continuation of U.S. Ser. No. 16/711,683 filed on Dec. 12, 2019, and entitled "Webpage Accessibility Compliance," which is hereby incorporated by reference in its entirety.

FIELD OF USE

Aspects of the disclosure relate generally to presentation of webpage content. More specifically, aspects of the disclosure provide techniques for ensuring that content presented by a webpage is accessible to all users.

BACKGROUND

Websites and associated webpages present a wide variety of content to users. The content may include, for example, any type of textual, graphical, image, or video content. The content may also include data fields for a user to input data, either by entering data directly or selecting an input from predetermined choices (e.g., using a drop-down menu).

Owners and/or operators of websites want their websites to be usable by a wide audience. Accordingly, many websites are designed to be accessible to disabled individuals. To confirm accessibility, webpages are often evaluated against various accessibility rules so that a determination as to the accessibility of a webpage may be determined. Webpages that are not complaint in view of the accessibility rules may be modified to be compliant. Once compliant, the webpage may be launched and made accessible to the public.

Websites undergo frequent changes. As a result, a formerly compliant webpage may require re-evaluation to determine if a modified version of the webpage meets accessibility rules. Conventional techniques for evaluating webpage accessibility compliance are often inefficient and inaccurate. For example, many conventional techniques for evaluating webpage accessibility compliance are limited to just reviewing underlying code (e.g., HTML) for generating the modified webpage. The modified code may be reviewed to detect any portion of the code that may generate presentation of content that does not meet the accessibility rules. Evaluating compliance in this manner may not detect certain accessibility issues as it is not based on the actual experience of using the modified webpage from the perspective of a disabled individual.

Aspects described herein may address these and other problems, and generally improve the reliability and accuracy of determining compliance of a modified webpage with accessibility rules.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may provide evaluation of a webpage for compliance with accessibility rules. According to some aspects, these and other benefits may be achieved by evaluating a current version of a webpage in view of a prior version of the webpage known to be complaint with the accessibility rules.

More particularly, some aspects described herein may provide a computer-implemented method for determining a compliance of a second version of a webpage with the one or more accessibility rules. The method may include displaying a first version of a webpage. The first version of the webpage may be compliant with the one or more accessibility rules. The first version of the webpage may be modified to create the second version of the webpage. The second version of the webpage may be displayed. A voiceover of the second version of the webpage may be initiated. The voiceover may include starting automatic text-to-speech software that reads aloud the second version of the webpage. The voiceover of the second version of the webpage may be recorded and stored. A textual transcript of the stored recording of the voiceover of the second version of the webpage may be generated. Compliance of the second version of the webpage with the one or more accessibility rules may then be determined based on the textual transcript of the stored recording of the voiceover of the second version of the webpage and based on the first version of the webpage. A user interface may indicate compliant and/or non-complaint portions of the textual transcript based on a comparison to a textual representation of the first version of the webpage and/or based on a comparison to the one or more accessibility rules directly.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for determining compliance of a webpage with accessibility rules. The webpage may be considered to be a current version of a webpage. The current version of the webpage may be a modified version of a prior version of the webpage. The prior version of the webpage may be complaint with the accessibility rules. Data corresponding to the current version of the webpage may be received. The current version of the webpage may be displayed based on the received data. A voiceover of the displayed current version of the webpage may be initiated and recorded. The recording may include starting a software program that automatically converts text to speech to audibly read aloud the current version of the webpage and to also record the announced speech. The recording of the voiceover of the displayed current version of the webpage may be stored. The stored recording of the voiceover of the displayed current version of the webpage may be converted to textual data. Compliance of the current version of the webpage with the accessibility rules may then be determined based on the textual data.

Before discussing these concepts in greater detail, however, several examples of a computing device that may be used in implementing and/or otherwise providing various aspects of the disclosure will first be discussed with respect to FIG. 1.

Figure 1:
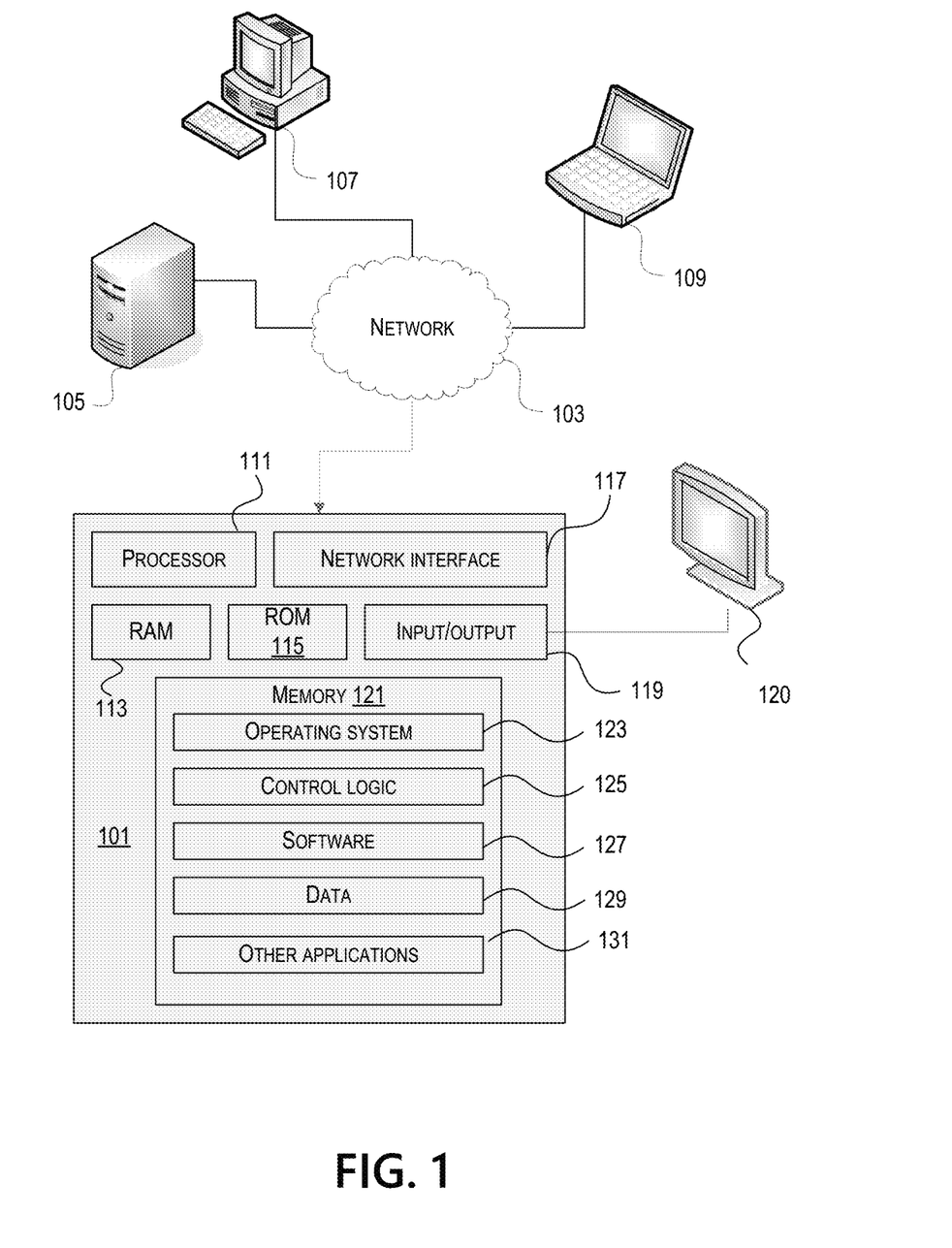
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, local area networks (LANs), wireless networks, personal networks (PAN), and the like. Network 103 is for illustration purposes and may be replaced with fewer or additional computer networks. A LAN may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, software 127, data 129, and other applications 131. Control logic 125 may be incorporated in and may be a part of software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to an example modification to a webpage that may trigger re-evaluation of compliance with accessibility rules.

Figure 2:
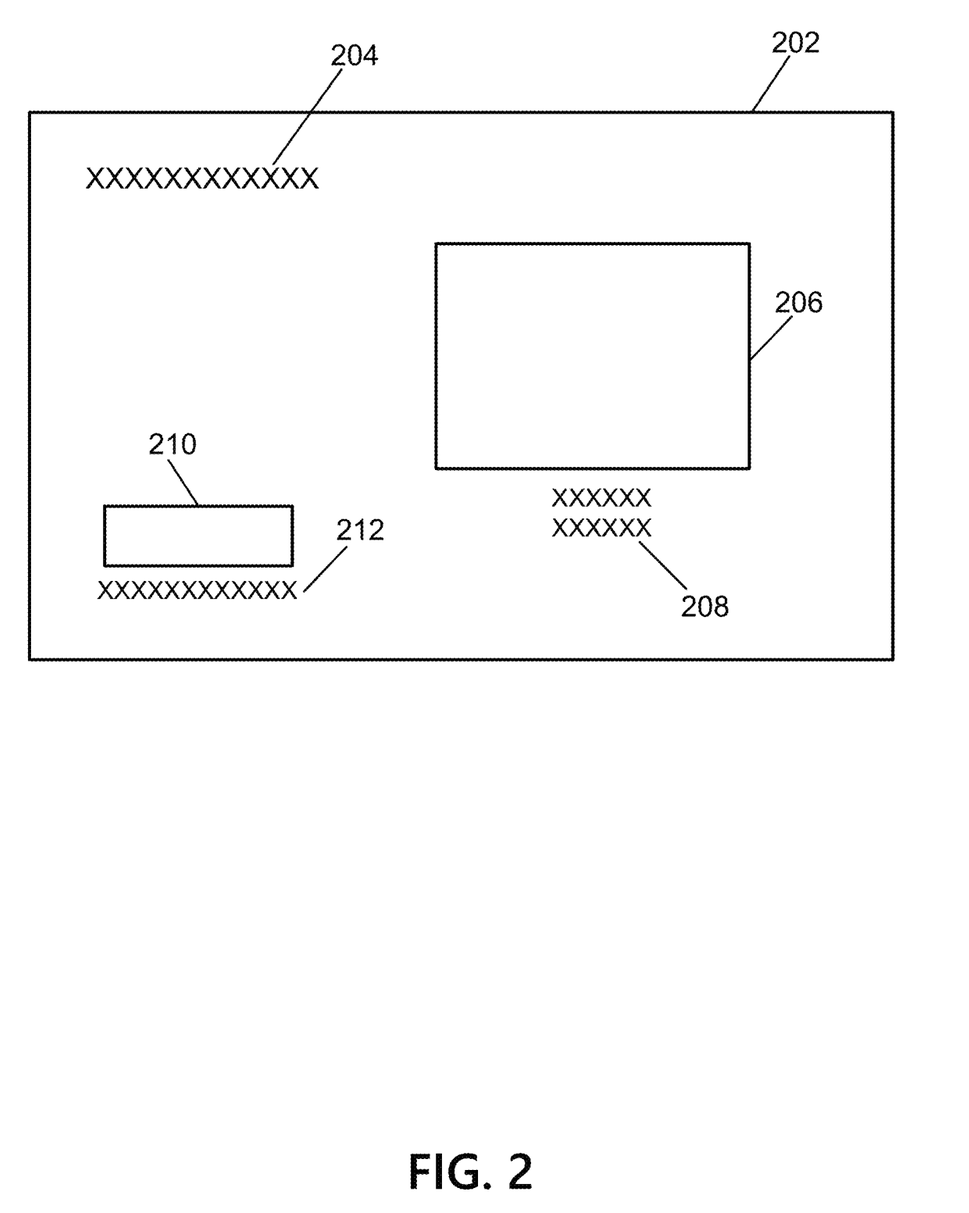
FIG. 2 depicts a first version of a webpage that is complaint with accessibility rules according to one or more aspects of the disclosure.

FIG. 2 illustrates a first or initial version of a webpage 202. The first version of the webpage 202 may include a variety of content. The content may be any type of content including visual and/or readable content, video content, textual content, and/or graphical content. As an example, the first version of the webpage 202 may include textual content 204, graphical content 206, textual content 208, data input field 210, and textual content 212.

The textual content 204 may provide a description of the first version of the webpage 202 and the content provided thereby. The graphical content 206 may be an image or picture. The textual content 208 may be a label or description of the graphical content 206. The input data field 210 may be any input field that may be used to input data by a user of the first version of the webpage 202. The input data field 210 may allow a user to enter data directly (e.g., through a keyboard) or may allow the user to select data based on a set of predetermined choices (e.g., through a drop-down menu). The textual content 212 may be an instruction or indicator specifying a type of data to be entered into the input data field 210. The first version of the webpage 202 is not limited to the example content 204-212 as the first version of the webpage 202 may include any type of content for presentation and use by a user.

The first version of the webpage 202 may be generated based on code (e.g. HTML, XML, Javascript, PHP, etc.). For purposes of explanation only, and without intent to limit, HTML is described as being used to generate webpages. The HTML code may specify the type, arrangement, and/or operation of the content of the webpage 202. The first version of the webpage 202 may be complaint with accessibility rules. The first version of webpage 202 may be compliant with the accessibility rules based on the HTML code used to generate the first version of the webpage 202. The accessibility rules may include one or more rules or tests for determining whether a webpage is accessible and/or usable by a disabled individual including, for example, individuals with physical disabilities such as visually impaired or blind individuals.

The accessibility rules may enable determination as to whether a webpage may be navigated (e.g., by using only keyboard inputs) by a disabled individual. The accessibility rules may enable determination as to whether a webpage conveys all of the included content or information of a webpage to a disabled individual. Some examples of determining whether a webpage conveys all content or information may include: whether a webpage may be read aloud by screen reader software; whether a user may be guided to and access a data input field of the webpage and be guided as to the type of information requested for input; whether tags or other descriptions (either included in the HTML code, embedded, or displayed on the webpage) are included for graphical or other visual content; and whether a transcript of video or audio content is provided.

In general, the accessibility rules may include one or more rules (e.g., tests) for determining a level of usability of a webpage by individuals with disabilities. The accessibility rules may assess the level of usability based on a variety of metrics such as those described herein. If a number of accessibility rules that are not met exceed a threshold, then the webpage may be determined to have a poor level of usability and may be deemed inaccessible (i.e., determined as not meeting accessibility compliance requirements). If a number of accessibility rules that are not met is below the threshold, then the webpage may be determined to have a good level of usability and may be deemed accessible (i.e., determined as meeting accessibility compliance requirements). In various embodiments, the threshold can be set to be zero ("0") such that any failure to meet one of the accessibility rules results in the determination that the webpage is not complaint with the accessibility rules.

In various embodiments, the accessibility rules may be self-imposed rules. For example, the accessibility rules may be developed by a website owner, operator, or developer. In various embodiments, the accessibility rules may be issued by a legal authority. As an example, the accessibility rules may be based on accessibility considerations specified within laws, rules, case law, or regulations associated with the American with Disabilities Act (ADA). Again, as described herein, the accessibility rules provide a manner for confirming the accessibility and/or usability of a website and/or webpage by a disabled individual and may specify techniques for providing content through a webpage to ensure accessibility. For purposes of explanation herein, the first version of the webpage 202 may be considered as being compliant with one or more accessibility rules.

Figure 3:
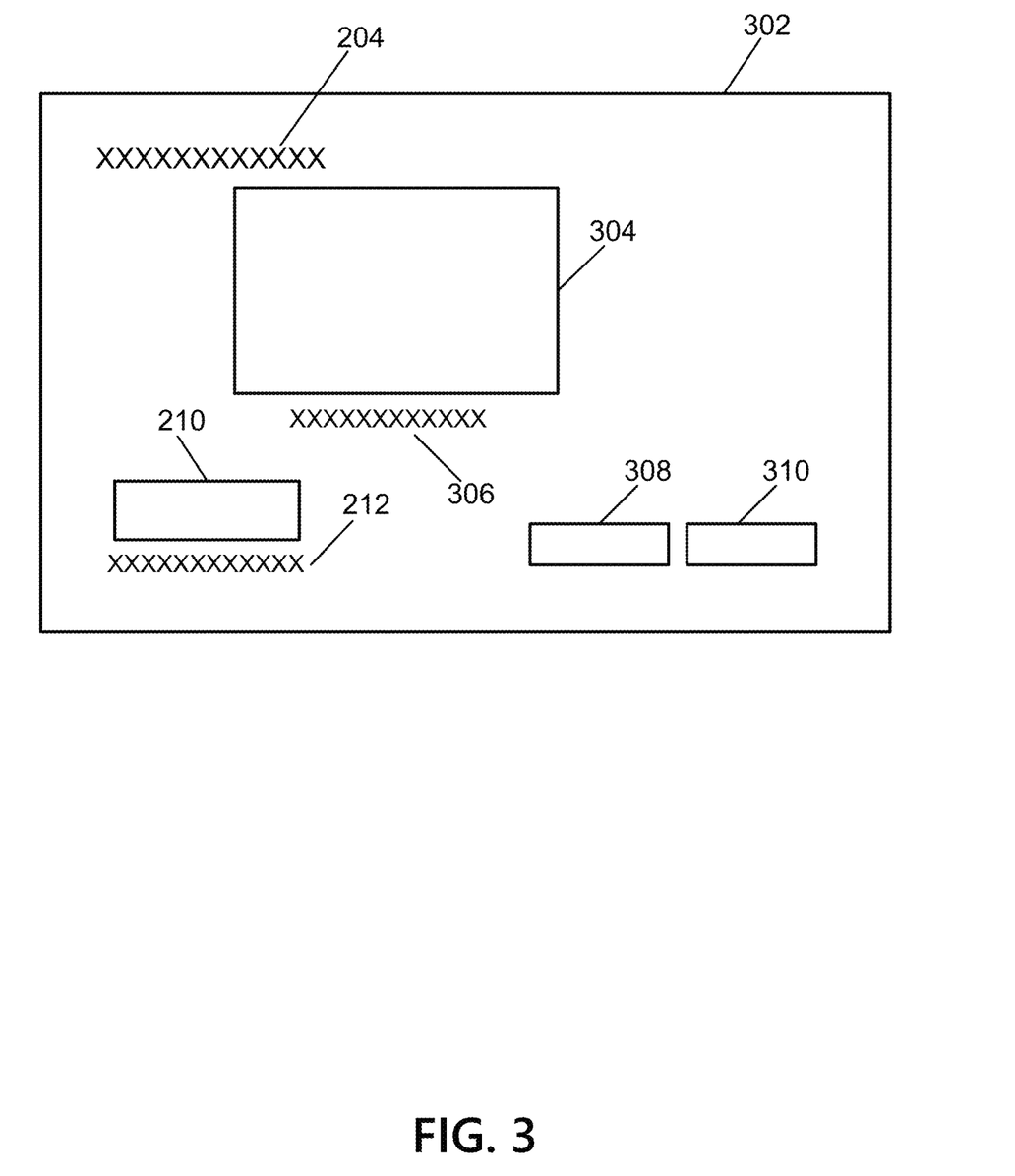
FIG. 3 depicts a second version of the webpage to be evaluated for compliance with the accessibility rules according to one or more aspects of the disclosure.

FIG. 3 illustrates a second or subsequent version of a webpage 302. The second version of the webpage 302 may also include a variety of content. The second version of the webpage 302 may represent a modified version of the first version of the webpage 202. The second version of the webpage 302 may include content from the first version of the webpage 202 and may also include new or different content. In various embodiments, the second version of the webpage 302 may be generated by modification of the HTML code used to generate the first version of the webpage 202.

As shown in FIG. 3, the second version of the webpage 302 may include the textual content 204, the data input field 210, and the textual content 212, each of which may have been provided by the first version of the webpage 202. The second version of the webpage 302 may additionally include the following new content (in comparison to the first version of the webpage 202): video content 304, textual content 306, data input field 308, and data input field 310. With the modifications of the first version of the webpage 202 to generate the second version of the webpage 302, the second version of the webpage 302 provides a new presentation of content.

It is desirable to ensure that the second version of the webpage 302 is compliant with the accessibility rules—for example, to ensure that presentation of any new content and/or all content meets any presentation and/or usability requirements imposed by the accessibility rules. Conventional techniques for evaluating compliance of a modified version of webpage that was initially compliant are ineffective and inefficient. Such conventional techniques often only rely on inspection of the HTML code for the modified webpage. That is, often only the modified portions of the HTML code in comparison to the original version of the HTML code corresponding to the initially complaint webpage are compared. By only focusing on changes to the underlying HTML code, these conventional techniques may not accurately reflect the actual user experience in using the modified webpage. In turn, modified versions of initially compliant webpages may be deemed complaint that are actually not accessible or useable by a disabled individual. Modified webpages that are actually not compliant with accessibility rules may therefore be made publicly available erroneously. Techniques described herein provide more accurate and reliable determinations of the compliance of a modified version of a webpage (e.g., the second version of the webpage 302) with one or more accessibility rules.

Figure 4:
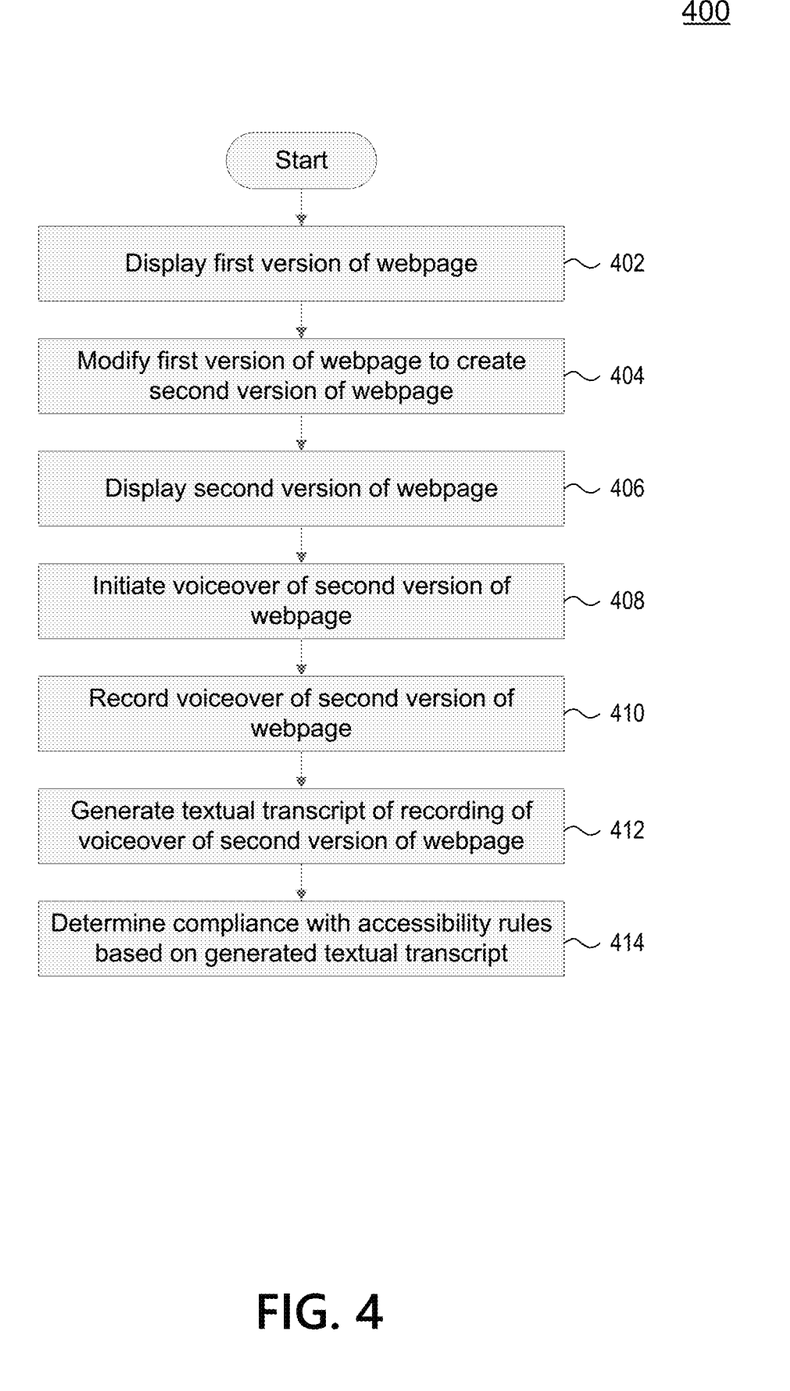
FIG. 4 depicts a flowchart for a first method for determining compliance of a modified version of a webpage with accessibility rules according to one or more aspects of the disclosure.

FIG. 4 illustrates an example method 400 for determining compliance of a modified version of a webpage with accessibility rules in accordance with one or more aspects described herein. Method 400 may be implemented based on the first version of the webpage 202 and the second version of the webpage 302 depicted in FIGS. 2 and 3, respectively. Method 400 may be implemented by a suitable computing system, as described herein. For example, method 400 may be implemented in any suitable computing environment by a computing device and/or combination of computing devices, such as computing devices 101, 105, 107, and 109 of FIG. 1. Method 400 may be implemented in suitable program instructions, such as in software 127, and may operate on data, such as data 129.

At step 402, a first version of a webpage may be displayed. The version of the webpage may be complaint with one or more accessibility rules. In various embodiments, the first version of the webpage may correspond to the first version of the webpage 202 depicted in FIG. 2. The accessibility rules may be self-imposed rules, rules issued by a legal authority, rules related to ADA requirements, and/or any other type of rules or regulations providing guidance for determining the usability and/or accessibility of a webpage or website by a disabled individual.

At step 404, the first version of the webpage may be modified to create a second version of the webpage. The first version of the webpage may be modified from any type of computing device, including a mobile device. The first version of the webpage may be modified by modifying HTML code used to generate the first version of the webpage. The second version of the webpage may include content from the first version of the webpage and may include new or additional content.

At step 406, the second version of the webpage may be displayed. In various embodiments, the second version of the webpage may correspond to the second version of the webpage 302 depicted in FIG. 3.

At step 408, a voiceover of the second version of the webpage may be initiated. The voiceover may audibly announce any content or features of the second version of the webpage. The voiceover may operate as and/or provide similar outputs as a screen reader program or application. In various embodiments, the voiceover may include automatic text-to-speech software that reads aloud the second version of the webpage. In various embodiments, the voiceover may sequentially step through all contents or features of the second version of the webpage. In various embodiments, the voiceover may audibly announce each content or feature based on its visual presentation and/or based on any related tag, description, or related information specified by the underlying HTML code.

In various embodiments, initiating the voiceover of the second version of the webpage may include generating audio data corresponding to each data input field within the second version of the webpage. The data input field may correspond to any type of user input feature or component for receiving user input data (e.g., a drop down menu, scroll button, radio button, etc.). In various embodiments, the voiceover of the second version of the webpage may include sequentially determining textual data associated with each data input field within the second version of the webpage. The associated textual data may be visually displayed and/or may be embedded as a tag or other descriptor associated with a data input field.

At step 410, the voiceover of the second version of the webpage may be recorded. The recording of the voiceover of the second version of the webpage may also be stored.

At step 412, a textual transcript of the stored recording of the voiceover of the second version of the webpage may be generated. The textual transcript may be generated by software that converts a recording into text. The textual transcript may also be stored at step 412.

At step 414, compliance of the second version of the webpage with the one or more accessibility rules may be determined. The compliance may be determined based on the textual transcript of the stored recording of the voiceover of the second version of the webpage and based on the first version of the webpage.

In various embodiments, determining the compliance of the second version of the webpage may include comparing the textual transcript to a baseline representation of the first version of the webpage. The baseline representation of the first version of the webpage may be, for example, a textual representation of a voiceover of the first version of the webpage.

In various embodiments, a user interface may be used to facilitate comparison of the textual transcript of the stored recording of the voiceover of the second version of the webpage to the baseline representation of the first version of the webpage. For example, the user interface may indicate one or more changes between the textual representation of the voiceover of the first version of the webpage and the textual transcript of the stored recording of the voiceover of the second version of the webpage. In various embodiments, compliance of the second version of the webpage may be determined by comparing the one or more changes to the one or more accessibility rules. In doing so, changes between the first and second versions of the webpages may be efficiently identified and compared to the accessibility rules to flag any changes that may not comply with the accessibility rules.

In various embodiments, compliance of the second version of the webpage with the one or more accessibility rules may be determined by directly comparing the textual transcript of the stored recording of the voiceover of the second version of the webpage to the one or more accessibility rules. In various embodiments, the results of the comparison may be presented by the user interface. As an example, the user interface may indicate portions of the textual transcript of the stored recording of the voiceover of the second version of the webpage that are not compliant with the one or more accessibility rules. Additionally or alternatively thereto, the user interface may indicate portions of the textual transcript of the stored recording of the voiceover of the second version of the webpage that are compliant with the one or more accessibility rules. As a result, an efficient and reliable manner for confirming the compliance of the second version of the webpage may be provided.

In various embodiments, portions of the method 400 may be implemented automatically. For example, one or more steps of the method 400 may be automatically implemented as specified by software. In this manner, an individual wishing to confirm the compliance of the second version of the website may initiate the software after displaying the second version of the webpage at step 406. Thereafter, one or more subsequent steps of the method 400 may be implemented automatically by the software at the request or initiation of the user.

As an example, accessibility rules may require each data input field of a webpage to include an associated description that may be read aloud by a screen reader program. The description may be visually presented on the webpage or may only be associated to the data input field within the underlying HTML code (e.g., as a tag associated with the data input field). The method 400 may be used to ensure that this accessibility rule is met by the second version of the webpage.

For example, the newly introduced data input field 310 may not be associated with a visual description that is displayed on the second version of the webpage 302. Instead, the data input field 310 may be associated with an embedded description (e.g., a tag within the HTML code associated with the data input field 310). The method 400 may confirm that the embedded (non-visually presented) description is indeed provided and is read aloud during the voiceover (e.g., by reviewing the transcript of the voiceover). If not, the method 400 may enable a user to determine that a required description of the data input field 310 is not provided, thereby necessitating modification of the underlying HTML code.

Figure 5:
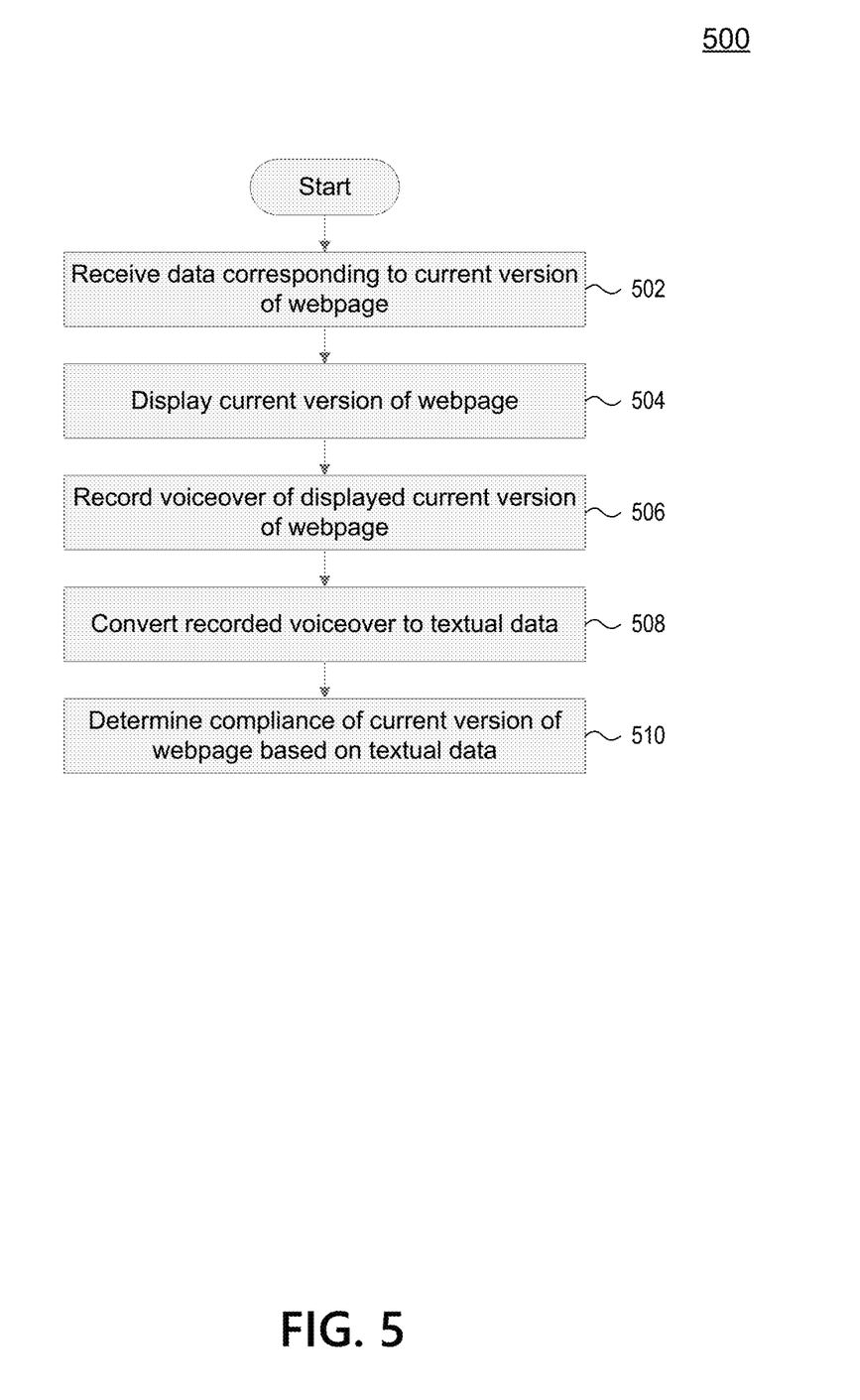
FIG. 5 depicts a flowchart for a second method for determining compliance of a modified version of a webpage with accessibility rules according to one or more aspects of the disclosure.

FIG. 5 illustrates an example method 500 for determining compliance of a modified version of a webpage with accessibility rules in accordance with one or more aspects described herein. Method 500 may be implemented based on the first version of the webpage 202 and the second version of the webpage 302 depicted in FIGS. 2 and 3, respectively. Method 500 may be implemented by a suitable computing system, as described herein. For example, method 500 may be implemented in any suitable computing environment by a computing device and/or combination of computing devices, such as computing devices 101, 105, 107, and 109 of FIG. 1. Method 500 may be implemented in suitable program instructions, such as in software 127, and may operate on data, such as data 129.

At step 502, data corresponding to a current version of a webpage may be received.

At step 504, the current version of the webpage may be displayed based on the received data. The current version of the webpage may be displayed on any type of display device.

At step 506, a voiceover of the displayed current version of the webpage may be recorded. In various embodiments, recording may include starting a software program that automatically converts text to speech to audibly read the current version of the webpage. The recording of the voiceover of the displayed current version of the webpage may then be stored. In various embodiments, recording the voiceover of the displayed current version of the webpage may include recording audible representations of information associated with input data fields within the current version of the webpage.

At 508, the stored recording of the voiceover of the displayed current version of the webpage may be converted to textual data.

At 510, compliance of the current version of the webpage to one or more user accessibility rules may be determined based on the textual data. In various embodiment, compliance may be determined by comparing the textual data to baseline textual data corresponding to a prior version of the webpage, which may be compliant with the one or more user accessibility rules. In various embodiments, the baseline textual data may be generated based on a recording of a voiceover of the prior version of the webpage.

In various embodiments, a user interface may indicate (e.g., visually on a display) one or more changes between the baseline textual data and the textual data. In various embodiment, the user interface may indicate that the one or more changes between the baseline textual data and the textual data are complaint with the one or more user accessibility rules based on comparing the one or more changes to the one or more user accessibility rules. In various embodiments, the user interface may indicate that the one or more changes between the baseline textual data and the textual data are not complaint with the one or more user accessibility rules based on comparing the one or more changes to the one or more user accessibility rules.

Some aspects described herein may provide benefits for determining compliance of a webpage to accessibility rules. Compliance testing may be based on simulating use of the webpage by a disabled individual. In doing so, the compliance testing may be more accurate and reliably, thereby reducing the risk of releasing a webpage to the public that is not accessible to one or more disabled individuals.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
 displaying a first version of a webpage, the first version of the webpage compliant with one or more accessibility rules, wherein the one or more accessibility rules indicate a level of usability of the webpage by a visually impaired individual;
 modifying the first version of the webpage to create a second version of the webpage;
 displaying the second version of the webpage;
 initiating a voiceover of an entirety of the displayed second version of the webpage;
 recording the voiceover of the entirety of the displayed second version of the webpage;
 generating a textual transcript of the recording of the voiceover of the entirety of the displayed second version of the webpage;
 comparing the textual transcript of the recording of the voiceover of the entirety of the displayed second version of the webpage to a textual representation of a voiceover of an entirety of the displayed first version of the webpage;
 determining, based on comparing the textual transcript of the recording of the voiceover of the entirety of the displayed second version of the webpage to the textual representation of the voiceover of the entirety of the displayed first version of the webpage, one or more changes between the textual transcript of the recording of the voiceover of the entirety of the displayed second version of the webpage and the textual representation of the voiceover of the entirety of the displayed first version of the webpage;
 determining a number of the one or more changes that do not meet the one or more accessibility rules;
 determining whether the second version of the webpage is compliant with the one or more accessibility rules based on comparing the number of the one or more changes that do not meet the one or more accessibility rules to a threshold; and
 indicating, based on the comparing the number of the one or more changes that do not meet the one or more accessibility rules to the threshold and via a displayed user interface, a level of usability of the displayed second version of the webpage by the visually impaired individual.

2. The method of claim 1, wherein the one or more accessibility rules are issued by a legal authority.

3. The method of claim 1, further comprising indicating, via the displayed user interface, the second version of the webpage is not compliant with the one or more accessibility rules when the number of the one or more changes that do not meet the one or more accessibility rules exceeds the threshold.

4. The method of claim 1, further comprising indicating, via the displayed user interface, the second version of the webpage is compliant with the one or more accessibility rules when the number of the one or more changes that do not meet the one or more accessibility rules is below the threshold.

5. The method of claim 1, further comprising indicating, via the displayed user interface, portions of the textual transcript of the recording of the voiceover of the entirety of the displayed second version of the webpage that are not compliant with the one or more accessibility rules.

6. The method of claim 1, further comprising indicating, via the displayed user interface, portions of the textual transcript of the recording of the voiceover of the entirety of the displayed second version of the webpage that are compliant with the one or more accessibility rules.

7. The method of claim 1, further comprising indicating, via the displayed user interface, portions of the textual transcript of the recording of the voiceover of the entirety of the displayed second version of the webpage that differ from the textual representation of the voiceover of the entirety of the displayed first version of the webpage.

8. The method of claim 1, wherein initiating the voiceover of the entirety of the displayed second version of the webpage comprises generating audio data corresponding to each data input field within the second version of the webpage.

9. The method of claim 8, wherein initiating the voiceover of the entirety of the displayed second version of the webpage comprises sequentially determining textual data associated with each data input field within the displayed second version of the webpage.

10. The method of claim 1, wherein the threshold is set to zero.

11. A computer-implemented method comprising:
displaying a first version of a webpage, the first version of the webpage compliant with one or more accessibility rules, wherein the one or more accessibility rules indicate a level of usability of the webpage by a disabled individual;
modifying the first version of the webpage to create a second version of the webpage;
displaying the second version of the webpage;
initiating a voiceover of an entirety of the displayed second version of the webpage;
recording the voiceover of the entirety of the displayed second version of the webpage;
generating a textual transcript of the recording of the voiceover of the entirety of the displayed second version of the webpage;
comparing the textual transcript of the recording of the voiceover of the entirety of the displayed second version of the webpage to a textual representation of a voiceover of an entirety of the displayed first version of the webpage;
determining, based on comparing the textual transcript of the recording of the voiceover of the entirety of the displayed second version of the webpage to the textual representation of the voiceover of the entirety of the displayed first version of the webpage, one or more changes between the textual transcript of the recording of the voiceover of the entirety of the displayed second version of the webpage and the textual representation of the voiceover of the entirety of the first version of the webpage;
determining a number of the one or more changes that do not meet the one or more accessibility rules;
determining whether the second version of the webpage is compliant with the one or more accessibility rules based on comparing the number of the one or more changes that do not meet the one or more accessibility rules to a threshold; and indicating, based on the comparing the number of the one or more changes that do not meet the one or more accessibility rules to the threshold and via a displayed user interface, a level of usability of the usability of the displayed second version of the webpage by the disabled individual.

12. The computer-implemented method of claim 11, further comprising indicating, via the displayed user interface, the second version of the webpage is not compliant with the one or more accessibility rules when the number of the one or more changes that do not meet the one or more accessibility rules exceeds the threshold.

13. The computer-implemented method of claim 11, further comprising indicating, via the displayed user interface, the second version of the webpage is compliant with the one or more accessibility rules when the number of the one or more changes that do not meet the one or more accessibility rules is below the threshold.

14. The computer-implemented method of claim 11, further comprising indicating, via the displayed user interface, portions of the textual transcript of the recording of the voiceover of the entirety of the displayed second version of the webpage that are not compliant with the one or more accessibility rules based on comparing the textual transcript of the recording of the voiceover of the entirety of the displayed second version of the webpage to the one or more accessibility rules.

15. The computer-implemented method of claim 11, further comprising indicating, via the displayed user interface, portions of the textual transcript of the recording of the voiceover of the entirety of the displayed second version of the webpage that are compliant with the one or more accessibility rules based on comparing the textual transcript of the recording of the voiceover of the entirety of the displayed second version of the webpage to the one or more accessibility rules.

16. The computer-implemented method of claim 11, further comprising indicating, via the displayed user interface, portions of the textual transcript of the recording of the voiceover of the entirety of the displayed second version of the webpage that differ from the textual representation of the voiceover of the entirety of the first version of the webpage.

17. The computer-implemented method of claim 11, wherein initiating the voiceover of the entirety of the second version of the webpage comprises generating audio data corresponding to each data input field within the displayed second version of the webpage.

18. The computer-implemented method of claim 17, wherein initiating the voiceover of the entirety of the displayed second version of the webpage comprises sequentially determining textual data associated with each data input field within the displayed second version of the webpage.

19. The computer-implemented method of claim 11, wherein the threshold is set to zero.

20. One or more non-transitory media storing instructions that, when executed by one or more processors, cause the one or more processors to perform steps comprising:

displaying a first version of a webpage, the first version of the webpage compliant with one or more accessibility rules, wherein the one or more accessibility rules indicate a level of usability of the webpage by a disabled individual;

modifying the first version of the webpage to create a second version of the webpage;

displaying the second version of the webpage;

initiating a voiceover of an entirety of the displayed second version of the webpage;

recording the voiceover of the entirety of the displayed second version of the webpage;

generating a textual transcript of the recording of the voiceover of the entirety of the displayed second version of the webpage;

comparing the textual transcript of the recording of the voiceover of the entirety of the displayed second version of the webpage to a textual representation of a voiceover of an entirety of the displayed first version of the webpage;

determining, based on comparing the textual transcript of the recording of the voiceover of the entirety of the displayed second version of the webpage to the textual representation of the voiceover of the entirety of the displayed first version of the webpage, one or more changes between the textual transcript of the recording of the voiceover of the entirety of the displayed second version of the webpage and the textual representation of the voiceover of the entirety of the first version of the webpage;

determining a number of the one or more changes that do not meet the one or more accessibility rules;

determining whether the second version of the webpage is compliant with the one or more accessibility rules based on comparing the number of the one or more changes that do not meet the one or more accessibility rules to a threshold; and indicating, based on comparing the number of the one or more changes that do not meet the one or more accessibility rules to the threshold and via a displayed user interface, a level of usability of the displayed second version of the webpage by the disabled individual.

* * * * *